United States Patent [19]

Schneider

[11] 4,456,106
[45] Jun. 26, 1984

[54] DRIVE FOR A VEHICLE EQUIPPED WITH A BRAKE

[75] Inventor: Arthur Schneider, Brunswick, Fed. Rep. of Germany

[73] Assignee: Volkswagenwerk Aktiengesellschaft, Fed. Rep. of Germany

[21] Appl. No.: 326,663

[22] Filed: Dec. 3, 1981

[30] Foreign Application Priority Data

Dec. 5, 1980 [DE] Fed. Rep. of Germany ....... 3045874

[51] Int. Cl.³ .............................................. B60K 41/28
[52] U.S. Cl. ............................ 192/0.055; 192/0.094; 192/0.082
[58] Field of Search ............... 192/0.055, 0.058, 0.082, 192/0.094, 3.21, 3.22, 3.28, 12 R, 13 R, 30 W, 3.23, 0.042, 82 T, 4 A

[56] References Cited

U.S. PATENT DOCUMENTS

| 2,858,675 | 11/1958 | Schneider | 192/3.23 |
| 3,533,493 | 10/1970 | Braun | 192/13 R |
| 4,350,234 | 9/1982 | Suga et al. | 192/0.094 |

Primary Examiner—George H. Krizmanich
Assistant Examiner—Mark Manley
Attorney, Agent, or Firm—Brumbaugh, Graves, Donohue & Raymond

[57] ABSTRACT

In a vehicle having an engine, wheels and brake, an overrunning device, preferably in the form of a clutch and associated mechanism, separates the engine and wheels in response to a torque reversal condition where the speed on the engine side of the overrunning device is less than the speed on the wheel side of the overrunning device. An overrunning suspension device causes reengagement of the clutch in response to a high brake temperature and a brake actuation, which indicates a need for an additional braking effect to be performed by the engine, such as during extended downhill driving.

5 Claims, 1 Drawing Figure

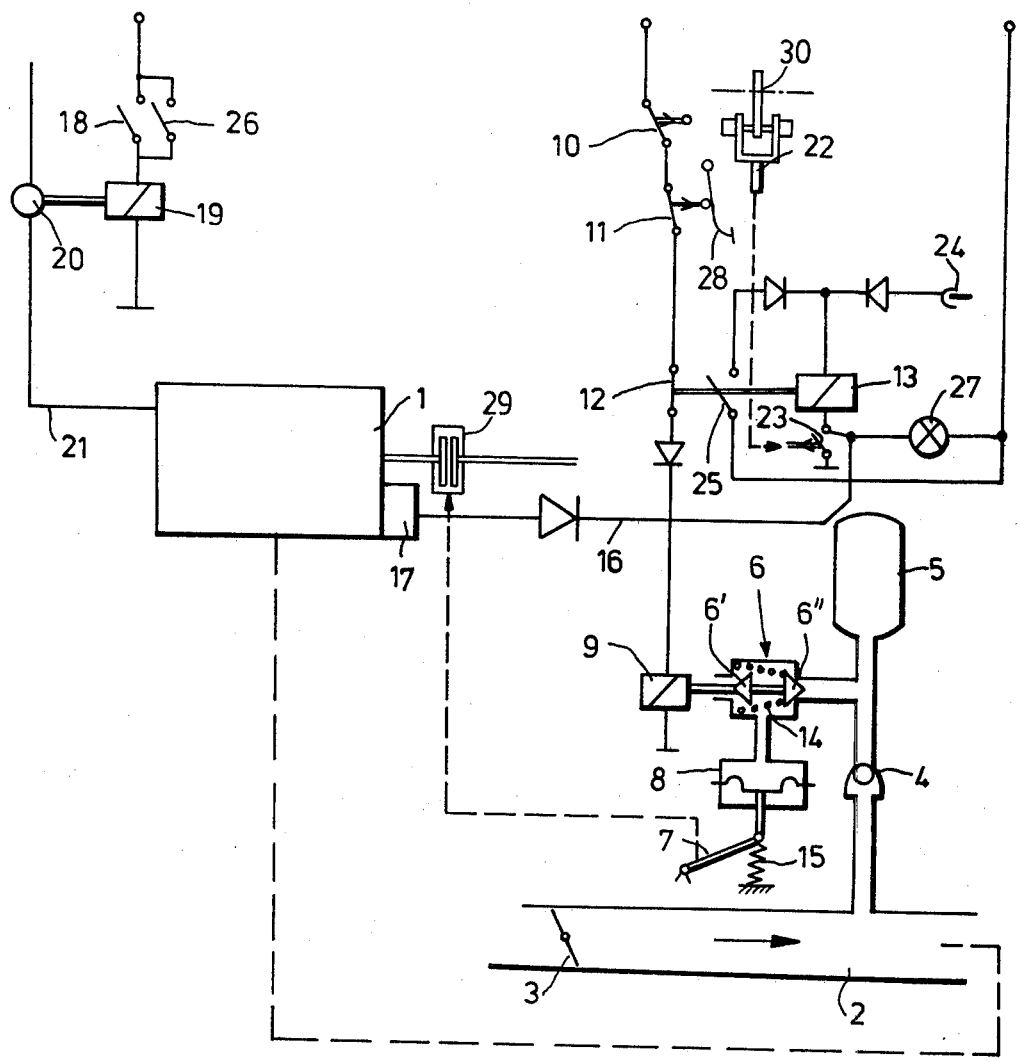

DRIVE FOR A VEHICLE EQUIPPED WITH A BRAKE

BACKGROUND OF THE INVENTION

1. Field of the Invention

The invention concerns a drive for separating the engine from the vehicle wheels upon a torque reversal condition and more particularly, to means for reengaging the engine and wheels in response to brake actuation and a heated brake condition.

2. Description of the Prior Art

Overrunning devices for separating the engine and wheels upon certain torque conditions have been employed in vehicles. As used herein, the term overrunning device refers to not only a clutch which transmits torques coming from the engine as also from the vehicle (during engine braking), but also a true overrunning device which connects the engine with the wheels only at torques coming from said engine and separates it on torque reversal. Torque reversal occurs not only during automotive operation and when the accelerator pedal is moved into its idling position but in general also when the number of revolutions of the output shaft of the engine drive unit becomes smaller than the number of revolutions of the wheel-side part of the overrunning device.

Automatic disengagement of the clutch when the accelerator pedal is in its idling position is known from U.S. Pat. No. 3,698,525 to Grassmuck. In the event that the braking action of the engine during overrunning should be required, the vehicle operator can reengage the clutch by actuation of a switch. For example, German DE No. 28 03 145 A1 describes a type of overrun disconnection apparatus wherein supply of an operating quantity (ignition current, fuel) to the internal combustion engine is interrupted when the accelerator pedal is in its idling position and the engine speed is above the idling speed. German patent application Nos. P 29 45 304.1-21 and P30 13 878.4 (corresponding to U.S. Ser. No. 350,525 filed Apr. 2, 1981) contain proposals for disconnecting the internal combustion engine during the idling phases and the restarting phase thereof as a function of the prevailing engine speed, either directly through the kinetic energy of the vehicle after engagement of the clutch, or through the electric starter motor.

These constructions and arrangements facilitate a fuel-saving manner of driving coupled with a simple operation of the internal combustion engine. However, disengagement of the overrunning device (i.e. clutch), and a possible stopping of the engine implies an attendant loss in the braking effect of the engine, resulting in an additional load on the brake, particularly during extended downhill driving. Therefore, control of an overrunning or clutch disengagement device should not be left solely to the discretion of the vehicle operator.

SUMMARY OF THE INVENTION

It is a purpose of the invention to provide a drive in such a manner that excessive load on the brake is avoided.

This purpose is attained in accordance with the invention by providing means for suspending separation of the engine and wheels under conditions of brake actuation and a high brake temperature. In the event that stopping of the internal combustion engine should be provided for in addition to the overrunning operation, the engine stopping is suspended in an advantageous manner upon attaining and/or exceeding a predefined value of the brake temperature, (i.e., the temperature of the brake fluid measured in the brake cylinder or of the caliper), so that upon termination of the overrunning operation, (reengagement of the clutch), the engine will run and an uncomfortable sudden jerk will be avoided.

The drive in accordance with the present invention operates in such a manner that upon attainment of the predefined brake temperature value, which results particularly as a result on extended downhill travel, the internal combustion engine, provided it is equipped with a disconnecting means for suspending operation of the engine, is connected or operated again and at the next-following actuation of the brake pedal, the clutch is engaged again or the overrunning device is blocked. Continued braking by the engine is effected after release of the brake pedal, by the provision of a holding or latching circuit for the signal generation means.

Numerous other advantages and features of the present invention will become readily apparent from the following detailed description of the invention and of one embodiment thereof, from the claims and from the accompanying drawings.

BRIEF DESCRIPTION OF THE DRAWING

The FIGURE is an electrical and hydraulic schematic illustrating an embodiment according to the invention.

DETAILED DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

An embodiment of the present invention will be explained herein for the special case in which a clutch is employed as an overrunning device, with reference being made to the FIGURE which schematically indicates only the elements of the drive of interest in this case.

The FIGURE shows a conventional internal combustion engine 1 having an intake manifold 2 with a throttle valve 3. The intake manifold 2 is connected, via the nonreturn (one way) valve 4 to a pressure chamber reservoir (vacuum tank) 5 which, in turn, is connected via a valve 6 with the upper chamber of a diaphragm aneroid capsule 8 serving as servomotor for a clutch. A conventional clutch lever facilitates disengagement of the clutch 29 which is normally engaged. The valve 6 is provided with an excitation winding 9 in an excitation circuit comprising, in series, a normally-closed clutch pedal contact 10, accelerator pedal contact 11, (which is closed when the accelerator 28 is in its idling position), and further contact 12 controlled by relay 13.

When the clutch and accelerator pedals are in their non-actuated position, i.e., when the contacts 10 and 11 are closed, the excitation circuit for the excitation winding 9 of the valve 6 is initially complete. Accordingly, valve members 6' and 6" are displaced from their rightmost position, as illustrated, in which the upper chamber of the diaphragm aneroid capsule 8 is ventilated, and move to the left against the action of a spring 14. The upper chamber of the aneroid capsule 8 is then connected with the pressure reservoir 5 and the capsule diaphragm is moved upward, in opposition to the force of the spring 15. This causes the clutch lever 7 to pivot counterclockwise, causing disengagement of the clutch.

The engine is provided with an automatic starting means 17, actuable via the drive line 16, which acutates the starter until the engine runs by its own power.

The excitation cicuit of the coil 19 of the valve 20 in the fuel line 21 has a contact 18 which is dependent on the accelerator pedal position. When the contact 18 is open, which is when the accelerator pedal is in its idling position, the valve 20 closes off the fuel 21.

During operating phases in which power is not demanded from the engine, the clutch 29 is disengaged, the internal combustion engine is separated from the wheels of the vehicle and the ignition circuit and fuel supply are interrupted.

When the engine is separated from the wheels of the vehicle and only the brake 30 is available for deceleration of the vehicle, there is a danger of excessive heating of the brake, i.e., the brake fluid, during extended downhill travel. However, in accordance with the present invention, on attainment of a predefined temperature in the brake system, i.e., the temperature of the brake fluid measured in the brake cylinder or the temperature of the caliper, an electric temperature sensor 22 (which may comprise a thermostatic switch) causes delivery of actuating signals for the switch 23 in the excitation circuit of the relay 13. With switch 23 closed, the excitation circuit of relay 13 will be completed when a second sensor in the form of brake pressure swtich 24 is actuated. The relay 13 will respond and open the contact 12 to interrupt the excitation circuit of the winding 9 of the valve 6. Consequently, the connection of the upper chamber of the diaphragm aneroid capsule 8 with the pressure reservoir 5 is terminated and ventilation of the said chamber reoccurs so that the clutch lever 7 is pivoted back (clockwise) and the clutch is again engaged. The state described, i.e., travel of the vehicle with the reengaged clutch, is maintained even after the opening of brake pressure switch 24 caused by release of the brake pedal, because of self-holding of the relay 13 by its own contact 25. The relay 13 is held until the temperature measured on the brake has dropped below the predefined value, whereupon the contact 23 will open again.

A further contact 26 is connected in parallel with the above-described contact 18 which is open during idling. Contact 26 is actuated (i.e. closed) in response to signals being produced by the temperature sensor 22 (the first sensor). The closing of contact 26 in response to a signal from temperature sensor 22 can be achieved in one of two ways. It may be obtained either directly, i.e., without interposition of the brake pressure switch 24, so that the excitation circuit for the valve coil 19 is closed prior to the engagement of the clutch for starting of the engine 1, or—in case the engine is started by means of an overrun flywheel—in such a manner that the contact 26 is a further contact of the relay 13. In either case, it is ensured that the case of an undesirably high temperature in the braking system, both the disconnection of the engine and the separation of the internal combustion engine from the driven wheels are suspended, so that the conventional brake of the vehicle will be relieved. The presence of a critical brake temperature of the brake, and thereby the impending engagement of the clutch is indicated to the operator by means of the signal lamp or transmitter 27.

Preferrably, the engagement of the clutch occurs relatively slowly so that a strong jerk is avoided. The frictional heat which thereby is generated on the clutch contributes to braking in a desirable manner through conversion of kinetic energy into heat.

Since, as mentioned initially, a torque reversal may occur even when the accelerator pedal is actuated and is not in its idling position, there may be provided a signal generator actuated by the freerunning device at the start of the freerunning operation in place of the contact 11 actuated by the accelerator pedal.

From the foregoing, it will be observed that numerous variations and modifications may be effected without departing from the true spirit and scope of the novel concept of the invention. It is to be understood that no limitation with respect to the specific embodiment illustrated herein is intended or should be inferred. It is, of course, intended to cover by the appended claims all such modifications as fall within the scope of the claims.

What is claimed is:

1. A drive for a vehicle having wheels, a brake, an internal combustion engine, and an overrunning device for disengaging the engine from the vehicle wheels upon torque reversal, comprising:
   first sensing means for measuring the temperature in the vicinity of the brake and for producing a temperature signal when the temperature exceeds a predefined temperature value;
   second sensing means for sensing actuation of the brake; and
   means for reengaging the engine with the vehicle wheels in response to said temperature signal and actuation of the brake.

2. The drive as set forth in claim 1, including disconnecting means for discontinuing the operation of the engine in response to said overrunning device disengaging the engine from the vehicle wheels, and wherein said disconnecting means resumes operation of the engine in response to said temperature signal from said first sensing means.

3. The drive as in claim 1 or 2, wherein the reengaging means includes a holding circuit which latches the reengaging means independently of further brake actuation, but which unlatches in response to absence of a temperature signal.

4. The drive as set forth in claim 1 or 2, wherein the overrunning device is a clutch and an associated disengagement device actuated when an accelerator pedal of the engine is in an idling position.

5. The drive as set forth in claim 1 or 2, including means for producing an indication signal in response to a temperature signal, to thereby warn the vehicle operator of a critical brake temperature.

* * * * *

UNITED STATES PATENT AND TRADEMARK OFFICE
CERTIFICATE OF CORRECTION

PATENT NO. : 4,456,106
DATED : June 26, 1984
INVENTOR(S) : Arthur Schneider

It is certified that error appears in the above-identified patent and that said Letters Patent is hereby corrected as shown below:

First page, Item [75], "Brunswick" should read --Braunschweig--;
First page, Item [56], after "References Cited" add --3,698,525
   Grassmuck...... 192/.075; DE 29 45 304 Al Germany; DE 28 03 145
   Al Germany--;
Column 2, line 54, after "clutch" insert --29--.

Signed and Sealed this

Twelfth Day of March 1985

[SEAL]

Attest:

DONALD J. QUIGG

Attesting Officer     Acting Commissioner of Patents and Trademarks